US012374780B2

(12) United States Patent
Choi et al.

(10) Patent No.: US 12,374,780 B2
(45) Date of Patent: Jul. 29, 2025

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Han Sub Ryu, Gyeongsangbuk-do (KR); Dong Pil Park, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 159 days.

(21) Appl. No.: 18/122,868

(22) Filed: Mar. 17, 2023

(65) Prior Publication Data

US 2023/0231298 A1 Jul. 20, 2023

Related U.S. Application Data

(63) Continuation of application No. PCT/KR2021/012961, filed on Sep. 23, 2021.

(30) Foreign Application Priority Data

Sep. 24, 2020 (KR) ........................ 10-2020-0123649

(51) Int. Cl.

| | |
|---|---|
| ***H01Q 1/24*** | (2006.01) |
| ***H01Q 1/50*** | (2006.01) |
| ***H01R 24/60*** | (2011.01) |

(52) U.S. Cl.

CPC ............... *H01Q 1/243* (2013.01); *H01Q 1/50* (2013.01); *H01R 24/60* (2013.01)

(58) Field of Classification Search

CPC ............ H01Q 1/243; H01Q 1/50; H01Q 1/44; H01Q 1/38; H01Q 5/42; H01Q 21/08; H01Q 1/22; H01Q 21/065; H01R 24/60; H01R 12/73; H01R 12/716; H01R 12/70; H01R 12/59; H01R 12/61; H01R 12/79

See application file for complete search history.

(56) References Cited

U.S. PATENT DOCUMENTS

2003/0137456 A1* 7/2003 Sreenivas ................ H01Q 5/42 343/700 MS
2005/0287837 A1 12/2005 Trobough
2019/0104212 A1* 4/2019 Lee ...................... H01Q 9/0435

(Continued)

FOREIGN PATENT DOCUMENTS

CN 217607005 U 10/2022
KR 10-2007-0090515 A 9/2007

(Continued)

OTHER PUBLICATIONS

International Search Report for PCT/KR2021/012961 mailed on Jan. 7, 2022.

*Primary Examiner* — Dameon E Levi
*Assistant Examiner* — Anna N Hamadyk
(74) *Attorney, Agent, or Firm* — The PL Law Group, PLLC

(57) ABSTRACT

An antenna package according to an embodiment includes an antenna device comprising an antenna unit, and a connector electrically connected to the antenna unit. The connector includes an insulator having a dielectric constant from 2 to 3.5 and a loss tangent from 0.0015 to 0.007 measured by a resonance method at 10 GHz, and a conductive connection structure insulated by the insulator and electrically connected to the antenna unit.

17 Claims, 6 Drawing Sheets

(56) References Cited

U.S. PATENT DOCUMENTS

| | | | | |
|---|---|---|---|---|
| 2019/0173209 | A1 | 6/2019 | Lu et al. | |
| 2019/0229404 | A1* | 7/2019 | Xia | H01Q 21/205 |
| 2020/0076035 | A1 | 3/2020 | Huh et al. | |
| 2020/0251825 | A1 | 8/2020 | Kim et al. | |
| 2021/0075162 | A1* | 3/2021 | Kim | C08L 67/00 |
| 2021/0274645 | A1* | 9/2021 | Hong | H05K 1/0219 |
| 2022/0173513 | A1* | 6/2022 | Hernandez | H05K 1/028 |
| 2023/0231322 | A1* | 7/2023 | Jung | H01Q 1/243 343/702 |

FOREIGN PATENT DOCUMENTS

| | | | |
|---|---|---|---|
| KR | 10-2008-0078287 | A | 8/2008 |
| KR | 10-2011-0052505 | A | 5/2011 |
| KR | 10-2013-0095451 | A | 8/2013 |
| KR | 10-2019-0038264 | A | 4/2019 |
| KR | 10-2020-0092031 | A | 8/2020 |

* cited by examiner

ANTENNA PACKAGE AND IMAGE DISPLAY DEVICE INCLUDING THE SAME

CROSS-REFERENCE TO RELATED APPLICATION AND CLAIM OF PRIORITY

The present application is a continuation application to International Application No. PCT/KR2021/012961 with an International Filing Date of Sep. 23, 2021, which claims the benefit of Korean Patent Application No. 10-2020-0123649 filed on Sep. 24, 2020 at the Korean Intellectual Property Office, the disclosures of which are incorporated by reference herein in their entirety.

BACKGROUND

1. Field

The present invention relates to an antenna package and an image display device including the same. More particularly, the present invention relates to an antenna package including an antenna device and an intermediate structure and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to developments of a mobile communication technology, an antenna capable of implementing, e.g., high frequency or ultra-high frequency band communication is needed in the display device.

However, if a driving frequency of the antenna increases, a signal loss may also increase. Further, as a length of a transmission path increases, the signal loss may further increase.

To connect the antenna to a main board of the image display device, a connection intermediate structure such as a flexible printed circuit board or a connector may be added. In this case, the signal loss may be caused by the connection intermediate structure.

Additionally, a radiation property of the antenna may be disturbed by a dielectric property of the connection intermediate structure, and a proper dielectric structure is needed for implementing a high frequency or ultra-high frequency radiation property.

For example, Korean Published Patent Application No. 2013-0095451 discloses an antenna integrated with a display panel, but fails to suggest an efficient circuit connection.

SUMMARY

According to an aspect of the present invention, there is provided an antenna package having improved radiation property and signaling efficiency.

According to an aspect of the present invention, there is provided an image display device including an antenna package with improved radiation property and signaling efficiency.

(1) An antenna package, including: an antenna device including an antenna unit; and a connector electrically connected to the antenna unit, wherein the connector includes: an insulator having a dielectric constant (Dk)

from 2 to 3.5 and a loss tangent (Df) from 0.0015 to 0.007 measured by a resonance method at 10 GHz; and a conductive connection structure insulated by the insulator and electrically connected to the antenna unit.

(2) The antenna package of the above (1), wherein the dielectric constant of the insulator is from 2.0 to 3.3, and the loss tangent is from 0.0015 to 0.0048.

(3) The antenna package of the above (1), wherein the insulator has at least one of a liquid crystal polymer (LCP) structure, a polyphenylene sulfide (PPS) structure, and a modified polyimide (MPI) structure.

(4) The antenna package of the above (1), further including: a first circuit board bonded to the antenna unit, the first circuit board including a signal wiring extending between the antenna unit and the connector; and a second circuit board coupled to the first circuit board by the connector, the second circuit board having an antenna driving integrated circuit chip mounted thereon.

(5) The antenna package of the above (4), wherein the connector includes a first connector mounted on the first circuit board, and a second connector mounted on the second circuit board.

(6) The antenna package of the above (5), wherein the first connector is a plug connector and the second connector is a receptacle connector.

(7) The antenna package of the above (5), wherein the first connector includes a first insulator, and the second connector includes a second insulator, wherein each of the first insulator and the second insulator has a dielectric constant (Dk) of 2 to 3.5 and a loss tangent (Df) of 0.0015 to 0.007 measured by a resonance method at 10 GHz.

(8) The antenna package of the above (4), wherein the connector includes a slot coupled to an end portion of the first circuit board, and the second circuit board includes an antenna connection port coupled to the connector.

(9) The antenna package of the above (4), wherein the first circuit board is a flexible printed circuit board (FPCB) and the second circuit board is a rigid printed circuit board.

(10) The antenna package of the above (4), wherein the first circuit board includes a first portion bonded to the antenna unit, and a second portion having a width smaller than that of the first portion, and the connector is combined with the second portion

(11) The antenna package of the above (4), wherein the antenna unit includes a plurality of antenna units arranged in an array form, and the signal wiring of the first circuit board includes a plurality of signal wirings, each of which is electrically connected to each of the plurality of antenna units.

(12) The antenna package of the above (11), wherein the conductive connection structure of the connector includes a plurality of conductive connection structures electrically connected to each of the plurality of signal wirings.

(13) The antenna package of the above (11), wherein the antenna units include first antenna units and second antenna units having different sizes.

(14) The antenna package of the above (13), wherein the first antenna units and the second antenna units have different resonance frequencies.

(15) The antenna package of the above (13), wherein the antenna device further includes an antenna dielectric layer on which the antenna units are disposed, and the first antenna units and the second antenna units are alternately and repeatedly arranged along a width direction on the antenna dielectric layer.

(16) The antenna package of the above (13), wherein the antenna device further includes an antenna dielectric layer on which the antenna units are disposed, and the antenna device includes a first radiation group formed by the first antenna units adjacent to each other in a width direction on the antenna dielectric layer, and a second radiation group formed by the second antenna units adjacent to each other in the width direction on the antenna dielectric layer.

(17) An image display device, including a display panel; and the antenna package according to embodiments as described above disposed on the display panel.

(18) The image display device of claim 17, further including: a main board disposed under the display panel; and an antenna driving integrated circuit chip mounted on the main board, wherein the antenna package is bent under the display panel and is coupled to the main board via the connector to be electrically connected to the antenna driving integrated circuit chip.

According to exemplary embodiments of the present invention, a first circuit board bonded to an antenna device and a second circuit board on which an antenna driving integrated circuit chip is mounted may be electrically connected to each other through a connector. Accordingly, a bonding or adhering process for connecting the first and second circuit boards may be omitted, and a stable circuit board connection may be easily realized.

According to exemplary embodiments, a dielectric material having a dielectric constant (Dk) and a loss tangent (Df) having a predetermined range may be used as an insulating structure included in the connector. Accordingly, a signal loss occurring in the connector in high-frequency or ultra-high-frequency communication may be suppressed.

In exemplary embodiments, the first circuit board may include a main substrate portion and a connector connecting portion having a width smaller than that of the main substrate portion. An antenna bonding stability and a sufficient space for arrangement of circuit wirings may be achieved by the main substrate portion, and improved connectivity with the connector and flexibility may be achieved by the connector connecting portion.

DETAILED DESCRIPTION OF THE EMBODIMENTS

According to exemplary embodiments of the present invention, there is provided an antenna package including a connection structure of an antenna device and a connector. According to exemplary embodiments of the present invention, there is also provided an image display device including the antenna package.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
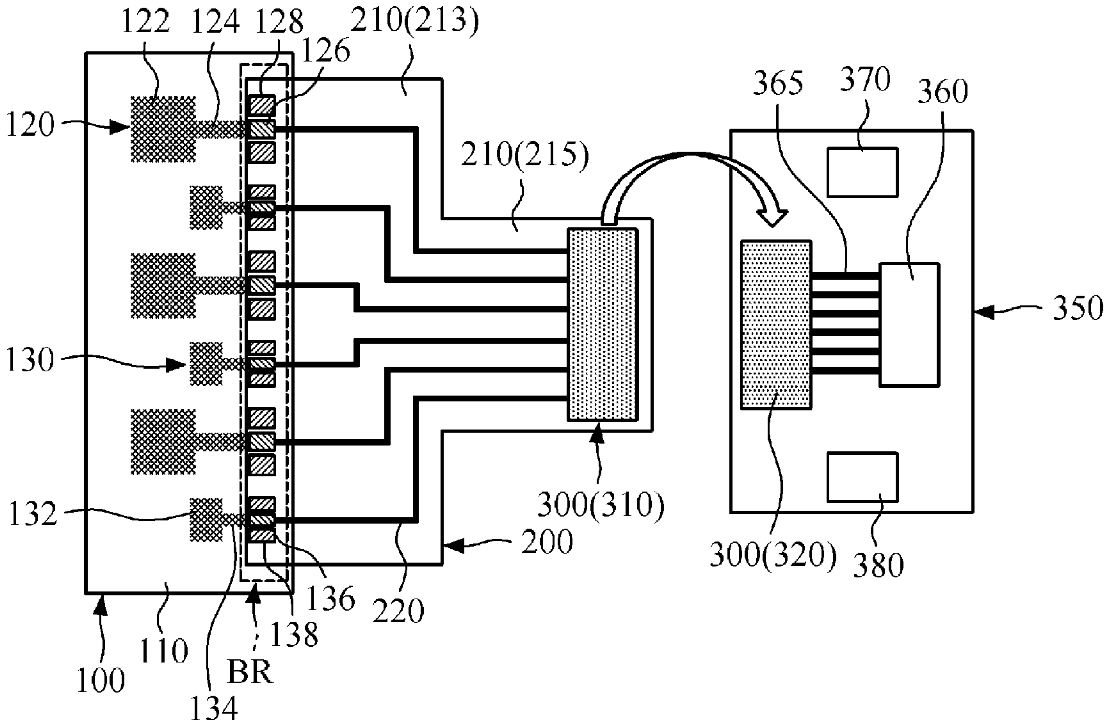
FIG. 1 is a schematic top planar view illustrating an antenna package in accordance with exemplary embodiments.

FIG. 1 is a schematic top planar view illustrating an antenna package in accordance with exemplary embodiments.

Referring to FIG. 1, the antenna package may include an antenna device 100, a first circuit board 200 and a connector 300. The antenna package may further include a second circuit board 350 connected to the first circuit board 200 via the connector 300.

The antenna device 100 may include an antenna dielectric layer 110 and antenna units 120 and 130 disposed on the antenna dielectric layer 110.

The antenna dielectric layer 110 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA) or an optically clear resin (OCR) may be included in the antenna dielectric layer 110. In some embodiments, the antenna dielectric layer 110 may include an inorganic insulating material such as silicon oxide, silicon nitride, silicon oxynitride, glass, or the like.

In some embodiments, a dielectric constant of the antenna dielectric layer 110 may be adjusted in a range from about 1.5 to about 12. When the dielectric constant exceeds about 12, a driving frequency may be excessively decreased, so that driving in a desired high or ultra-high frequency band may not be implemented.

The antenna units 120 and 130 may be formed on a top surface of the antenna dielectric layer 110. For example, a plurality of the antenna units 120 and 130 may be arranged in an array form along a width direction of the antenna dielectric layer 110 or the antenna package to form an antenna unit row.

In some embodiments, the antenna units 120 and 130 may include first antenna units 120 and second antenna units 130, and the first antenna unit 120 and the second antenna unit 130 may have different resonance frequencies.

The first antenna unit 120 may include a first radiator 122 and a first transmission line 124. The second antenna unit

130 may include a second radiator 132 and a second transmission line 134. The radiators 122 and 132 may have, e.g., a polygonal plate shape, and the first and second transmission lines 124 and 134 may extend from sides of the first and second radiators 122 and 132, respectively. The transmission lines 124 and 134 may be formed as single members substantially integral with the radiators 122 and 132, respectively.

The first antenna unit 120 and the second antenna unit 130 may further include a first signal pad 126 and a second signal pad 136, respectively. The first signal pad 126 and the second signal pad 136 may be connected to one end portions of the first transmission line 124 and the second transmission line 134, respectively.

In an embodiment, the signal pads 126 and 136 may be provided as substantially integral members with the transmission lines 124 and 134, respectively, and terminal end portions of the transmission lines 124 and 134 may serve as the signal pads 126 and 136.

In some embodiments, ground pads 128 and 138 may be disposed around the signal pads 126 and 136. For example, a pair of first ground pads 128 may be disposed to face each other with the first signal pad 126 interposed therebetween. A pair of second ground pads 138 may be disposed to face each other with the second signal pad 136 interposed therebetween. The ground pads 128 and 138 may be electrically and physically separated from the transmission lines 124 and 134 and the signal pads 126 and 136.

In exemplary embodiments, the first antenna unit 120 and the second antenna unit 130 may have different sizes. In an embodiment, an area of the first radiator 122 included in the first antenna unit 120 may be larger than an area of the second radiator 132 included in the second antenna unit 130. In an embodiment, a length of the first transmission line 124 included in the first antenna unit 120 may be greater than a length of the second transmission line 134 included in the second antenna unit 130.

As described above, the first antenna unit 120 and the second antenna unit 130 may have different resonance frequencies. In exemplary embodiments, the resonance frequency of the first antenna unit 120 may be smaller than the resonance frequency of the second antenna unit 130. In a non-limiting example, the resonance frequency of the first antenna unit 120 may be from about 20 GHz to 30 GHz (e.g., from about 20 GHz or more and less than 30 GHz), and the resonance frequency of the second antenna unit 130 may be from about 30 GHz to 40 GHz.

As illustrated in FIG. 1, the first antenna units 120 and the second antenna units 130 having different sizes and/or resonance frequencies may be repeatedly and alternately arranged in, e.g., a row direction. Accordingly, a uniformity of radiation coverage throughout an entire area of the antenna device 100 may be improved.

The antenna units 120 and 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination therefrom.

In an embodiment, the antenna units 120 and 130 may include silver (Ag) or a silver alloy (e.g., silver-palladium-copper (APC) alloy) to provide a low resistance. In an embodiment, the antenna units 120 and 130 may include copper (Cu) or a copper alloy (e.g., copper-calcium (CuCa) alloy) in consideration of a low resistance and a fine line width patterning.

In some embodiments, the antenna units 120 and 130 may include a transparent conductive oxide such as indium tin oxide (ITO), indium zinc oxide (IZO), indium zinc tin oxide (ITZO), zinc oxide (ZnOx), or the like.

In some embodiments, the antenna units 120 and 130 may include a multi-layered-structure of a transparent conductive oxide layer and a metal layer. For example, the antenna units 120 and 130 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In some embodiments, the radiators 122 and 132 and the transmission lines 124 and 134 may include a mesh-pattern structure to improve a transmittance. In this case, a dummy mesh electrode (not illustrated) may be formed around the radiators 122 and 132 and the transmission lines 124 and 134.

The signal pads 126 and 136 and the ground pads 128 and 138 may have a solid pattern formed of the above-described metal or alloy in consideration of a reduction of a feeding resistance, a noise absorption efficiency and an improvement of a horizontal radiation property.

In an embodiment, the radiators 122 and 132 may have a mesh-pattern structure, and the transmission lines 124 and 134, the signal pads 126 and 136 and the ground pads 128 and 138 may be formed as the solid metal pattern.

In this case, the radiators 122 and 132 may be disposed in a display area of the image display device, and the transmission lines 124 and 134, the signal pads 126 and 136 and the ground pads 128 and 138 may be disposed in a non-display area or a bezel area of the image display device.

In an embodiment, at least portions of the transmission lines 124 and 134 may include the solid metal pattern, and may be disposed in the non-display area or the bezel area of the image display device.

The first circuit board 200 may include a core layer 210 and signal wirings 220 formed on a surface of the core layer 210. For example, the first circuit board 200 may be a flexible printed circuit board (FPCB).

In some embodiments, the antenna dielectric layer 110 may serve as the circuit board 200. In this case, the circuit board 200 (e.g., the core layer 210 of the circuit board 200) may be provided as a substantially integral member with the antenna dielectric layer 110. Further, the signal wiring 220 that will be described later may be directly connected to the transmission lines 124 and 134, and the pads 126, 128, 136 and 138 may be omitted.

The core layer 210 may include, e.g., a flexible resin such as a polyimide resin, a modified polyimide (MPI), an epoxy resin, polyester, a cycloolefin polymer (COP), a liquid crystal polymer (LCP), or the like. The core layer 210 may include an internal insulating layer included in the circuit board 200.

The signal wirings 220 may serve as, e.g., feeding lines. The signal wirings 220 may be arranged on one surface of the core layer 210 (e.g., a surface facing the antenna units 120 and 130).

For example, the circuit board 200 may further include a coverlay film formed on the one surface of the core layer 210 and covering the signal wirings 220.

The signal wirings 220 may be connected or bonded to the signal pads 126 and 136 of the antenna units 120 and 130. For example, one end portions of the signal wirings 220 may be exposed by partially removing the coverlay film of the circuit board 200. The exposed end portions of the signal wirings 220 may be bonded to the signal pads 126 and 136.

For example, a conductive bonding structure such as an anisotropic conductive film (ACF) may be attached on the signal pads 126 and 136, and then a bonding region (BR) may be positioned on the conductive bonding structure. Thereafter, the bonding region BR of the circuit board 200 may be attached to the antenna device 100 by a heating/pressing process so that the signal wirings 220 may be electrically connected to each of the signal pads 126 and 136.

As illustrated in FIG. 1, the signal wirings 220 may each be independently connected or bonded to each of the signal pads 126 and 128 of the antenna units 120 and 130. In this case, feeding and control signals may be independently supplied from an antenna driving integrated circuit (IC) chip 360 to each of the antenna units 120 and 130.

In some embodiments, the predetermined number of the first antenna units 120 and the second antenna units 130 may be coupled through the signal wirings 220.

In some embodiments, the circuit board 200 or the core layer 210 may include a first portion 213 and a second portion 215 having different widths, and the second portion 215 may have a width smaller than a width of the first portion 213.

The first portion 213 may be provided as, e.g., a main substrate portion of the circuit board 200. One end portion of the first portion 213 may include the bonding region BR, and the signal wirings 220 may extend on the first portion 213 from the bonding region BR to the second portion 215.

Figure 4:
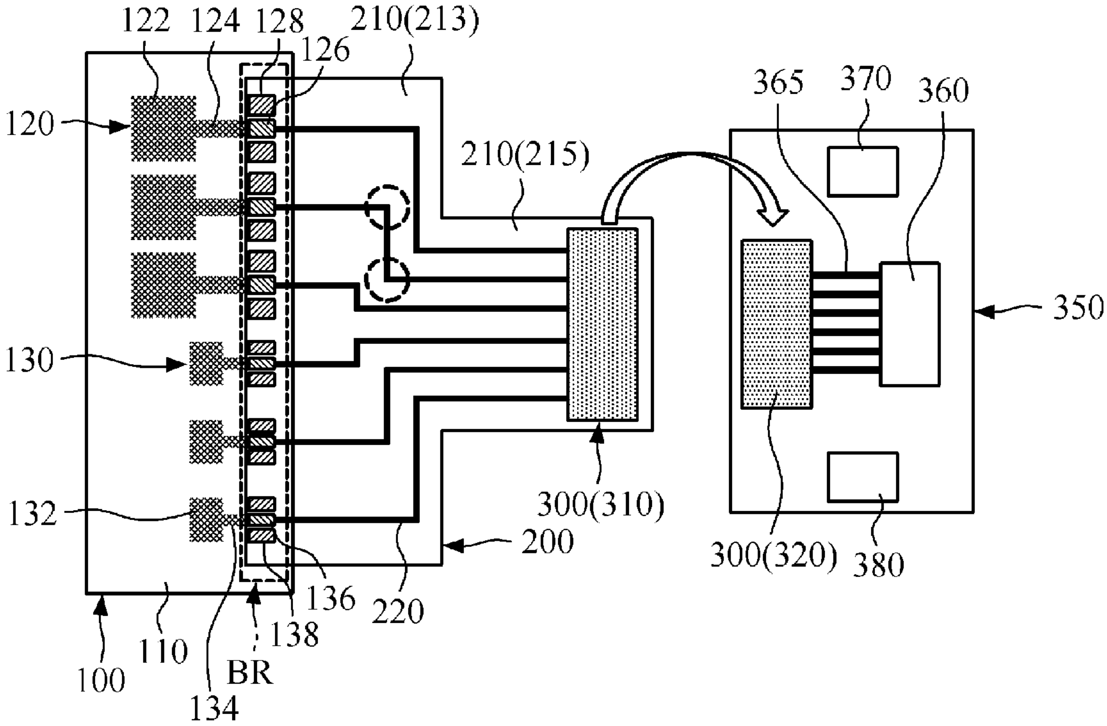
FIG. 4 is a schematic top planar view illustrating an antenna package in accordance with some exemplary embodiments.

The signal wirings 220 may include a bent portion on the first portion 213 (as indicated by a dotted circle in FIG. 4). Accordingly, the signal wirings 210 may extend on the second portion 215 having the relatively narrow width than that of the first portion 213 with a smaller spacing or a higher wiring density.

The second portion 215 may be provided as a connector connecting portion. For example, the second portion 215 may be bent toward a rear surface of the image display device to be electrically connected to the second circuit board 350. Accordingly, a circuit connection of the signal wirings 220 may be easily implemented using the second portion 215 having the reduced width.

Additionally, bonding stability with the antenna device 100 may be improved through the first portion 213 having the large width. If the antenna units 120 and 130 of the antenna device 100 are arranged in the array form, a sufficient distribution space of the signal wirings 220 may be provided by the first portion 213.

In exemplary embodiments, the first circuit board 200 and the second circuit board 350 may be electrically connected to each other by the connector 300.

In some embodiments, the connector 300 may serve as a Board to Board (B2B) connector, and may include a first connector 310 and a second connector 320.

The first connector 310 may be mounted on the second portion 215 of the first circuit board 210 by a surface mount technology (SMT) to be electrically connected to terminal end portions of the signal wirings 220

The second circuit board 350 may be, e.g., a main board of the image display device, or a rigid printed circuit board. For example, the second circuit board 350 may include a resin (e.g., epoxy resin) layer impregnated with an inorganic material such as glass fiber (e.g., a prepreg) as a base insulating layer, and may include circuit wirings distributed on a surface and at an inside of the base insulating layer.

The antenna driving IC chip 360 may be mounted on the second circuit board 350. As described above, the second connector 320 may be mounted on the second circuit board 350 by, e.g., a surface mount technology (SMT). For example, the second connector 320 may be electrically connected to the antenna driving IC chip 360 via a connection wiring 365 included in the second circuit board 350.

As indicated by an arrow in FIG. 1, the first connector 310 mounted on the first circuit board 200 and the second connector 320 mounted on the second circuit board 350 may be coupled to each other. For example, the first connector 310 may be provided as a plug connector, and the second connector 320 may be provided as a receptacle connector.

Accordingly, a connection of the first and second circuit boards 200 and 350 through the connector 300 may be implemented, and an electrical connection of the antenna driving IC chip 360 and the antenna units 120 and 130 may be implemented. Accordingly, the feeding/control signal (e.g., a phase, a beam tilting signal, etc.) may be applied from the antenna driving IC chip 360 to the antenna units 120 and 130. Additionally, an intermediate structure of the first circuit board 200—the connector 300—the second circuit board 350 may be formed.

As described above, the first and second circuit boards 200 and 350 may be electrically coupled to each other using the connector 300. Accordingly, the first and second circuit boards 200 and 350 may be easily connected to each other using the connector 300 without an additional bonding process or a heating/pressing process.

Therefore, a dielectric loss due to thermal damages to a substrate and a resistance increase due to wiring damages caused by the heating/pressing process may be prevented to suppress a signal loss in the antenna units 120 and 130.

Further, the second portion 215 of the first circuit board 200 on which the first connector 310 is mounted may be bent to couple the first connector 310 to the second connector 320 so that a connection with the second circuit board 350 disposed at a rear portion of the image display device may be easily implemented.

A circuit device 370 and a control device 380 may be mounted on the second circuit board 350 together with the antenna driving IC chip 360. The circuit device 370 may include, e.g., a capacitor such as a multilayer ceramic capacitor (MLCC), an inductor, a resistor, or the like. The control device 380 may include, e.g., a touch sensor driving IC chip, an application processor (AP) chip, or the like.

Figure 2:
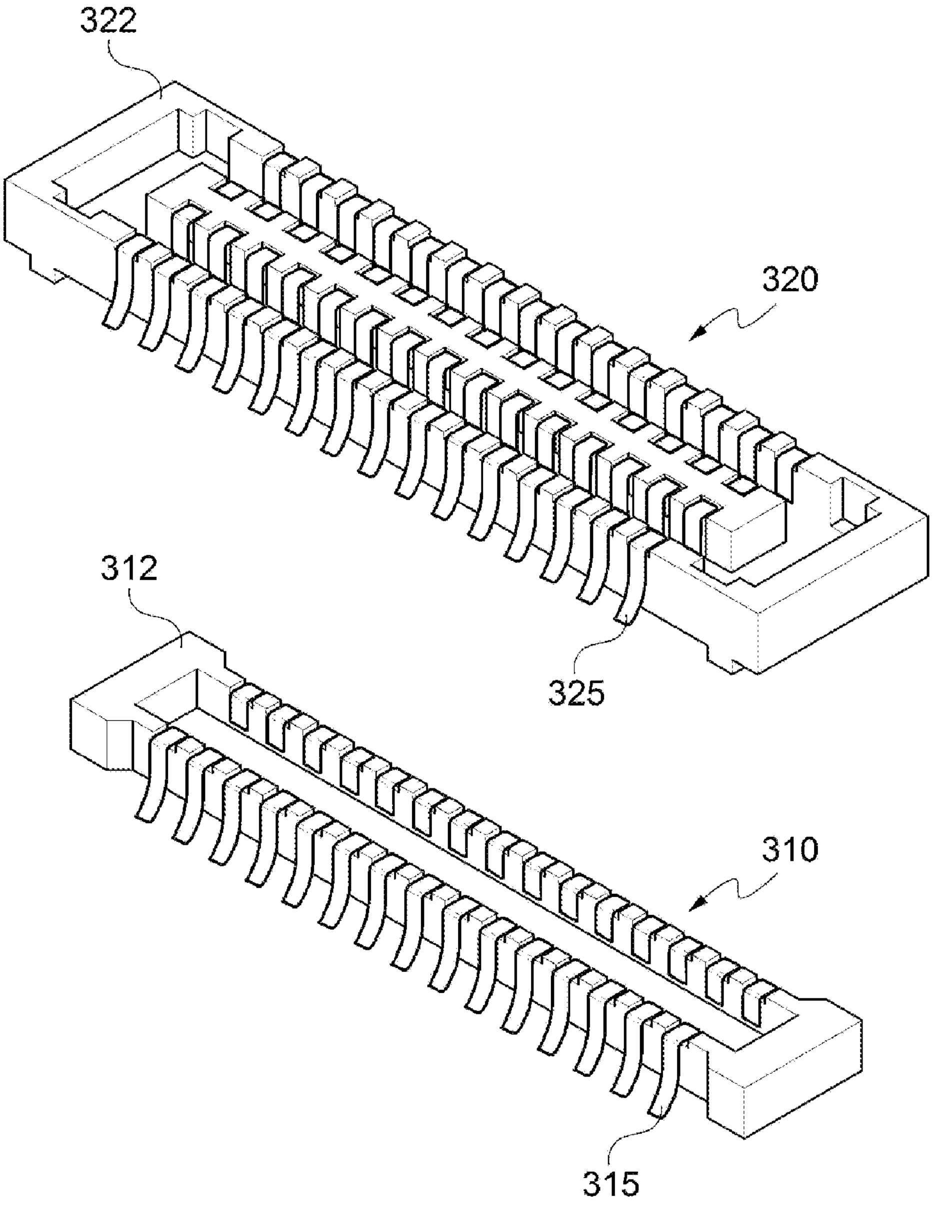
FIG. 2 is a schematic view illustrating a connector included in an antenna package in accordance with exemplary embodiments.

FIG. 2 is a schematic view illustrating a connector included in an antenna package in accordance with exemplary embodiments.

Referring to FIG. 2, as described above, the connector 300 may include the first connector 310 and the second connector 320. The first connector 310 and the second connector 320 may be coupled to each other in a male-female screw type or a plug-connector type.

The connector 300 may include an insulator and conductive connection structures. The first connector 310 may include a first insulator 312 and first conductive connection structures 315, and the second connector 320 may include a second insulator 322 and second conductive connection structures 325.

The insulators 312 and 322 may serve as a base or body of the connector 300, and may provide insulating barriers between the conductive connection structures 315 and 325. The conductive connection structures 315 and 325 may include terminal leads protruding to an outside of the insulators 312 and 322 as illustrated in FIG. 2, and connection patterns between the insulating barriers provided by the insulators 312 and 322.

The terminal leads included in the first connector 310 may be connected to the signal wirings 220 formed on the first circuit board 310 by a fusion, a soldering, etc., and the terminal leads included in the second connector 320 may be connected to the connecting wirings 365 included in the second circuit board 350 by a fusion, a soldering, etc. As the first connector 310 may be combined with the second connector 320, the connection patterns may be connected to each other to be in contact with each other.

In exemplary embodiments, the insulators 312 and 322 may include an insulating material having a dielectric constant (Dk) in a range from 2 to 3.5, and a loss tangent (Df, or dielectric loss) in a range from 0.0015 to 0.007.

Within the above range, a signal loss and a gain reduction in the connector 300 may be suppressed in a communication band of a high-frequency or ultra-high frequency corresponding to, e.g., 20 GHz or more, and sufficient radiation properties from the antenna units 120 and 130 may be achieved.

For example, if the dielectric constant of the insulators 312 and 322 exceeds 3.5 and the loss tangent exceeds 0.007, the signal loss due to an intervention of the connector 300 may be increased excessively, and the antenna package structure described with reference to FIG. 1 may not provide sufficient communication properties in a band of 3G, 4G, 5G or higher For example, if the dielectric constant of the insulators 312 and 322 is less than 2 and the loss tangent is less than 0.0015, mechanical and thermal stability of the connector 300 may be deteriorated, and an overall circuit connection reliability of the antenna package may be degraded.

In a preferable embodiment, the dielectric constant of the insulators 312 and 322 may be from 2.0 to 3.3, and the loss tangent may be from 0.0015 to 0.0048. More preferably, the dielectric constants of the insulators 312 and 322 may be from 2.0 to 2.9, and the loss tangent may be from 0.0015 to 0.003.

The dielectric constant and loss tangent may be values measured at a resonance frequency of 10 GHz using a resonance method. For example, the dielectric constant and the loss tangent may be converted from an S21 value and a Q value (Quality factor) extracted by disposing the insulator between a pair of electrodes of a resonator and applying an electromagnetic wave through the electrode.

In some embodiments, the insulators 312 and 322 may have a liquid crystal polymer (LCP) structure, a polyphenylene sulfide (PPS) structure and/or a modified polyimide (MPI) structure.

For example, the insulators 312 and 322 may have at least one LCP structure among structural units represented by Chemical Formulae 1 to 4 below.

[Chemical Formula 1]

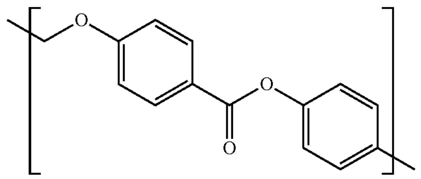

[Chemical Formula 2]

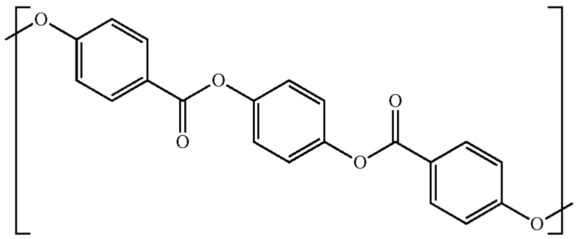

[Chemical Formula 3]

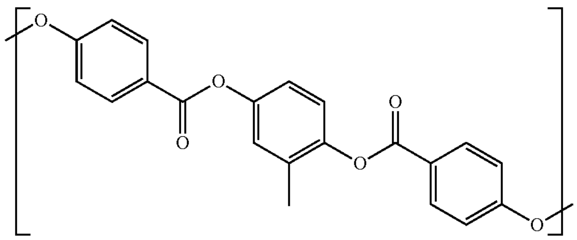

[Chemical Formula 4]

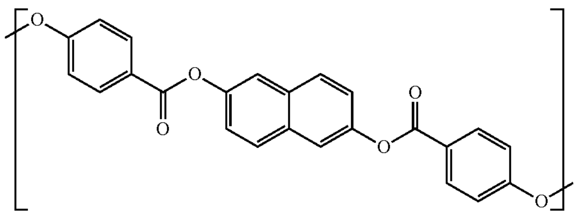

The PPS structure may include a polyphenylene sulfide backbone —(Ar—S—)— (herein, Ar represents a phenylene group). The phenylene group (—Ar—) may include, e.g., a p-phenylene group, a m-phenylene group, an o-phenylene group, a substituted phenylene group (e.g., an alkylphenylene group having a substituent such as a C1-C5 alkyl group, an arylphenyl group having a substituent such as a phenyl group, etc.), a diphenylene sulfone group, a biphenylene group, a diphenylene ether group, a diphenylene carbonyl group, etc.

The LCP structure and the PPS structure may each include a plurality of aromatic units in a molecular structure thereof, and thus may have increased mechanical and structural stability. Additionally, the aromatic units may be rotatably combined, so that a deviation of local dielectric polarization may be reduced.

Accordingly, the insulators 312 and 322 including the LCP and/or PPS structures according to exemplary embodiments may have remarkably lower dielectric constant and loss tangent values.

Further, the dielectric constant and loss tangent values in the above-described ranges may be obtained by employing the modified MPI to have low dielectric properties.

Figure 3:
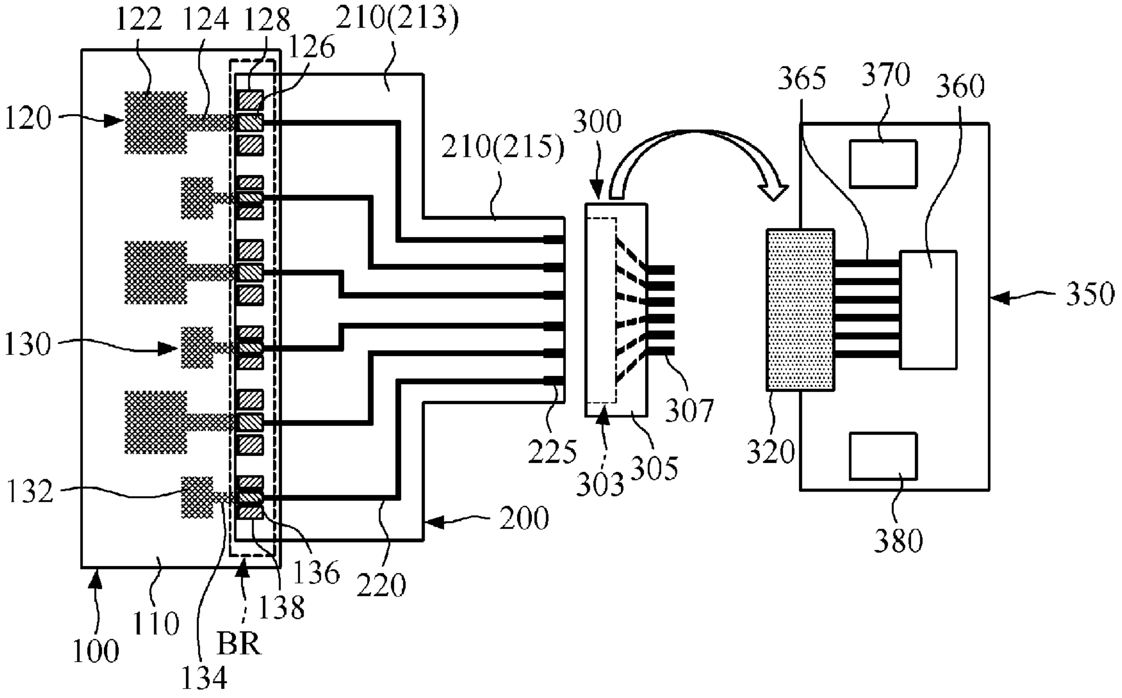
FIG. 3 is a schematic top planar view illustrating an antenna package in accordance with exemplary embodiments.

FIG. 3 is a schematic top planar view illustrating an antenna package in accordance with exemplary embodiments. Detailed descriptions of elements and materials substantially the same as or similar to those described with reference to FIG. 1 are omitted.

Referring to FIG. 3, the connector 300 may be provided as a Board to Film (B2F) connector. For example, the connector 300 may include an insulator 305, and the insulator 305 may include a slot 303 into which an end of the second portion 215 of the first circuit board 210 is inserted.

Connection terminals 225 formed at end portions of the signal wirings 220 may be disposed on the end of the second portion 215, and the connection terminals 225 may be inserted into the slot 303 of the connector 305 to be electrically connected to each of connection plugs 307.

The connection plugs 307 of the connector 305 may be insulated from each other by the insulator 305, and may be electrically connected to the antenna driving IC chip 360 through an antenna connection port 320 included in the second circuit board 350.

The insulator 305 may include a dielectric material having the above-described dielectric constant and loss tangent ranges, and may preferably include the LCP structure, the PPS structure and/or the MPI.

FIG. 4 is a schematic top planar view illustrating an antenna package in accordance with some exemplary embodiments. Detailed descriptions of elements and structures substantially the same as or similar to those described with reference to FIGS. 1 to 3 are omitted.

Referring to FIG. 4, the first antenna units 120 included in the antenna device 100 may be disposed to be adjacent to each other, and the second antenna units 130 may be disposed to be adjacent to each other.

For example, a plurality of the first antenna units 120 may be arranged to be adjacent to each other in a row direction to form a first radiation group. Further, a plurality of the second antenna units 130 may be arranged to be adjacent to each other in the row direction to form a second radiation group. The first radiation group and the second radiation group may be spaced apart from each other by a predetermined distance and may be adjacent to each other in the row direction.

Accordingly, the antenna units having the same resonance frequency may be disposed to be adjacent to each other in the row direction. Thus, a radiation gain may be intensified or increased in a limited area.

As described with reference to FIGS. 1 to 4, the antenna device 100 may include the antenna units having different sizes and different resonance frequencies. In some embodiments, the antenna device 100 may include the antenna units having the same size and the same resonance frequency in an array form.

Figure 5:
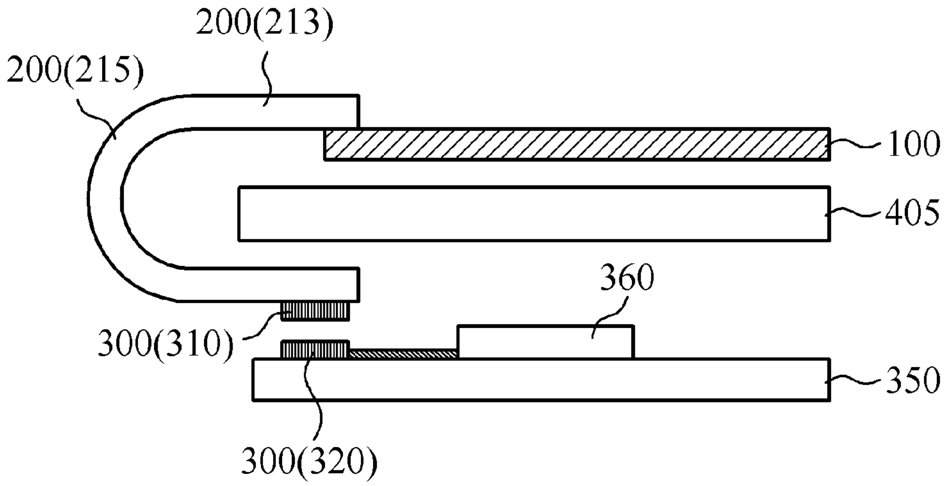
FIGS. 5 and 6 are a schematic cross-sectional view and a top planar view, respectively, illustrating an image display device in accordance with exemplary embodiments.
Figure 6:
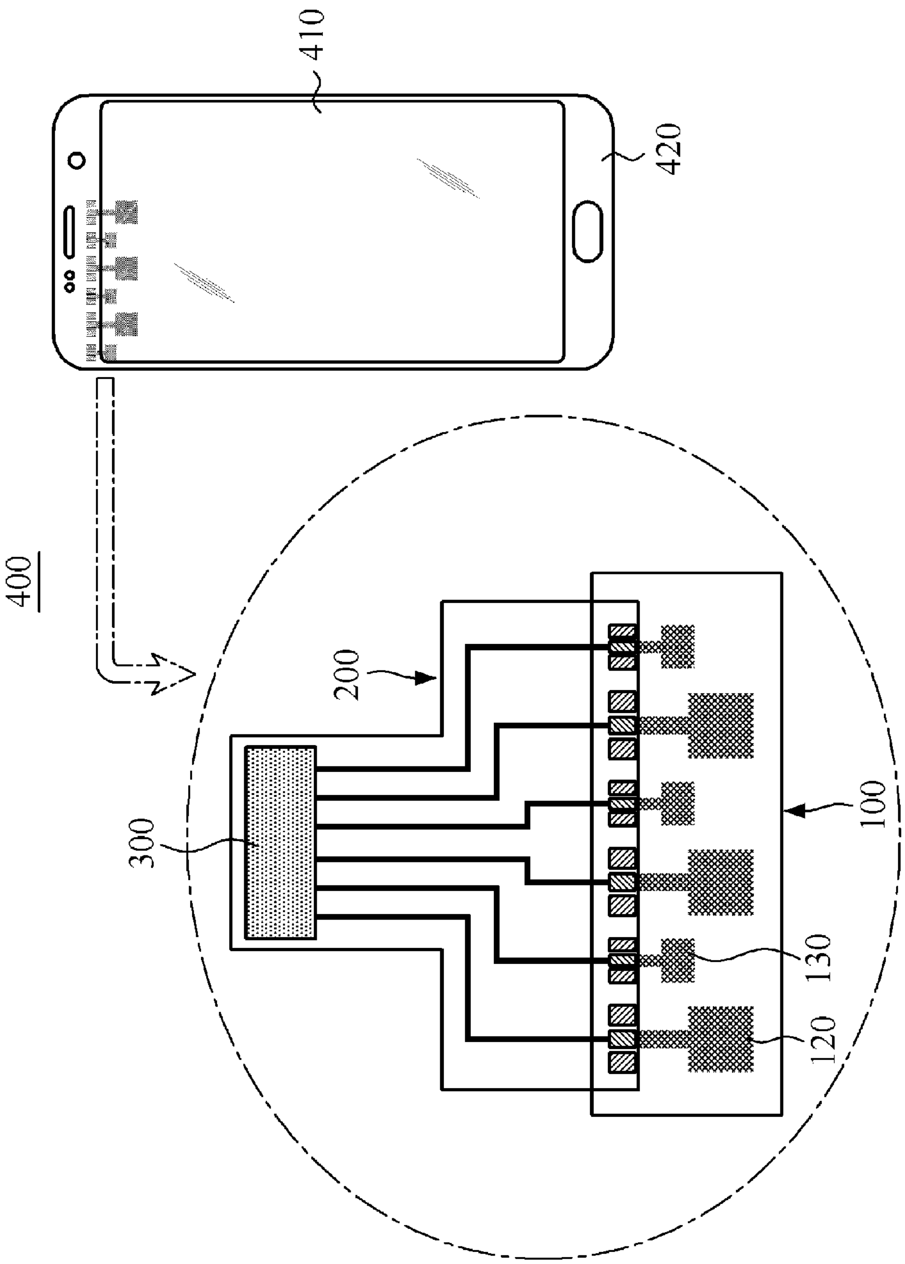

FIGS. 5 and 6 are a schematic cross-sectional view and a top planar view, respectively, illustrating an image display device in accordance with exemplary embodiments. For convenience of description, an illustration of the second circuit board 350 is omitted in FIG. 6.

Referring to FIGS. 5 and 6, the image display device 400 may be implemented in the form of, e.g., a smart phone, and FIG. 6 illustrates a front face or a window surface of the image display device 400. The front face of the image display device 400 may include a display area 410 and a peripheral area 420. The peripheral area 420 may correspond to, e.g., a light-shielding portion or a bezel portion of the image display device.

The antenna device 100 included in the above-described antenna package may be disposed toward the front face of the image display device 400. For example, the antenna package may be disposed on a display panel 405. In an embodiment, the radiators 122 and 132 may be at least partially disposed in the display area 410.

In this case, the radiators 122 and 132 may include a mesh-pattern structure, and a reduction of transmittance due to the radiators 122 and 132 may be prevented. The pads 126, 128, 136 and 138 included in the antenna units 120 and 130 may be formed of a solid metal pattern and may be disposed in the peripheral area 420 to prevent a deterioration of image quality.

In some embodiments, the first circuit board 200 may be bent using the second portion 215 and may be disposed on a rear portion of the image display device 400 and may extend to the second circuit board 350 (e.g., the main board) on which the antenna driving IC chip 360 may be mounted.

The first circuit board 200 and the second circuit board 350 may be interconnected through the connectors 310 and 320 to implement a feeding and a driving control to the antenna device 100 from the antenna driving IC chip 360.

As described above, the circuit connection by bending may be stably provided using the connector 300, and the high-frequency or ultra-high frequency antenna may be effectively applied to the image display device 400 using the construction of the insulator included in the connector.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXPERIMENTAL EXAMPLE

An insulator (30 mm×50 mm, thickness: 0.95 mm) sample containing a material used for a connector was placed between opposing electrodes of a resonator (SPDR (Split Post Dielectric Resonators), QWED), and an electromagnetic wave of 10 GHz was introduced for a resonance (detailed shape and dimension of the resonator.

Further, a sample substrate (thickness: 50 μm, length: 40 mm) including the insulator material and including a transmission line formed thereon was fabricated, and S-parameter (S21, see equation below) value was extracted using a network analyzer (Anritsu MS46522B network analyzer). The dielectric constant (Dk) and loss tangent (Df) of the insulator were converted from the extracted values.

$$S21(dB)=10\times Log(Output\ Power/Input\ Power)$$

The experimental results are shown in Table 1 below. LCP, PPS and MPI resin products with different chemical compositions, which are commercially available were purchased and used as the materials for insulators.

The evaluation criteria are as follows.

◎: S21: 0 dB to −2.5 dB

○: S21: Less than −2.5 dB and −3 dB or more x: S21: less than −3 dB

TABLE 1

| Type | Dielectric Constant (Dk) | Loss Tangent (Df) | S21(dB) | Results |
|---|---|---|---|---|
| Example 1 (LCP) | 3.3 | 0.0022 | −2.32 | ◎ |
| Example 2 (LCP) | 3.3 | 0.0023 | −2.38 | ◎ |
| Example 3 (LCP) | 2.0 | 0.0015 | −1.57 | ◎ |
| Example 4 (LCP) | 2.9 | 0.0015 | −1.76 | ◎ |
| Example 5 (MPI) | 3.2 | 0.005 | −2.67 | ○ |

TABLE 1-continued

| Type | Dielectric Constant (Dk) | Loss Tangent (Df) | S21(dB) | Results |
|---|---|---|---|---|
| Example 7 (MPI) | 3.5 | 0.007 | −2.72 | ○ |
| Example 8 (LCP) | 2.9 | 0.003 | −2.47 | ◎ |
| Example 9 (LCP) | 2.0 | 0.0048 | −1.99 | ◎ |
| Example 10 (LCP) | 2.9 | 0.0048 | −2.49 | ◎ |
| Example 11 (MPI) | 3.5 | 0.0048 | −2.98 | ○ |
| Example 12 (PPS) | 3.0 | 0.003 | −2.01 | ◎ |
| Comparative Example 1 (MPI) | 3.5 | 0.0075 | −3.12 | X |
| Comparative Example 2 (MPI) | 3.6 | 0.007 | −3.05 | X |
| Comparative Example 3 (LCP) | 3.8 | 0.0125 | −3.89 | X |
| Comparative Example 4 (LCP) | 4.1 | 0.0206 | −4.23 | X |
| Comparative Example 5 (PI) | 2.9 | 0.035 | −4.11 | X |

Referring to Table 1, in Examples where the dielectric constant of the insulator was adjusted in the range of 2 to 3.5 and the loss tangent was adjusted is in the range of 0.0015 to 0.007, the enhanced S21 value of −3.0 dB or more was obtained.

What is claimed is:

1. An antenna package comprising:

an antenna device comprising an antenna dielectric layer and an antenna unit disposed on the antenna dielectric layer;

a connector electrically connected to the antenna unit, the connector comprising:

an insulator having a dielectric constant from 2 to 3.5 and a loss tangent from 0.0015 to 0.007 measured by a resonance method at 10 GHz;

a conductive connection structure insulated by the insulator and electrically connected to the antenna unit;

a first circuit board bonded to the antenna device using an anisotropic conductive film (ACF), the first circuit board comprising a signal wiring extending between the antenna unit and the connector; and a second circuit board coupled to the first circuit board by the connector, the second circuit board having an antenna driving integrated circuit chip mounted thereon.

2. The antenna package of claim 1, wherein the dielectric constant of the insulator is from 2.0 to 3.3, and the loss tangent is from 0.0015 to 0.0048.

3. The antenna package of claim 1, wherein the insulator has at least one of a liquid crystal polymer structure, a polyphenylene sulfide structure, and a modified polyimide structure.

4. The antenna package of claim 1, wherein the connector includes a first connector mounted on the first circuit board, and a second connector mounted on the second circuit board.

5. The antenna package of claim 4, wherein the first connector is a plug connector and the second connector is a receptacle connector.

6. The antenna package of claim 4, wherein the first connector comprises a first insulator, and the second connector comprises a second insulator; and each of the first insulator and the second insulator has a dielectric constant of 2 to 3.5 and a loss tangent of 0.0015 to 0.007 measured by a resonance method at 10 GHz.

7. The antenna package of claim 1, wherein the connector comprises a slot coupled to an end portion of the first circuit board; and the second circuit board comprises an antenna connection port coupled to the connector.

8. The antenna package of claim 1, wherein the first circuit board is a flexible printed circuit board and the second circuit board is a rigid printed circuit board.

9. The antenna package of claim 1, wherein the first circuit board includes a first portion bonded to the antenna unit, and a second portion having a width smaller than that of the first portion; and the connector is combined with the second portion.

10. The antenna package of claim 1, wherein the antenna unit includes a plurality of antenna units arranged in an array form; and the signal wiring of the first circuit board includes a plurality of signal wirings, each of which is electrically connected to each of the plurality of antenna units.

11. The antenna package of claim 10, wherein the conductive connection structure of the connector includes a plurality of conductive connection structures electrically connected to each of the plurality of signal wirings.

12. The antenna package of claim 10, wherein the antenna units include first antenna units and second antenna units having different sizes.

13. The antenna package of claim 12, wherein the first antenna units and the second antenna units have different resonance frequencies.

14. The antenna package of claim 12, wherein the first antenna units and the second antenna units are alternately and repeatedly arranged along a width direction on the antenna dielectric layer.

15. The antenna package of claim 12, wherein the antenna device includes a first radiation group formed by the first antenna units adjacent to each other in a width direction on the antenna dielectric layer, and a second radiation group formed by the second antenna units adjacent to each other in the width direction on the antenna dielectric layer.

16. An image display device, comprising:

a display panel; and the antenna package of claim 1 disposed on the display panel.

17. The image display device of claim 16, further comprising:

a main board disposed under the display panel; and an antenna driving integrated circuit chip mounted on the main board, wherein the antenna package is bent under the display panel and is coupled to the main board via the connector to be electrically connected to the antenna driving integrated circuit chip.

* * * * *